(12) United States Patent
Wang et al.

(10) Patent No.: US 10,885,446 B2
(45) Date of Patent: Jan. 5, 2021

(54) BIG-DATA DRIVEN TELEMATICS WITH AR/VR USER INTERFACES

(71) Applicant: SAP SE, Walldorf (DE)

(72) Inventors: Xuemin Wang, Shanghai (CN); Baoguo Zhang, Shanghai (CN); Xing Zhao, Shanghai (CN); Lin Cai, Shanghai (CN); Rajnish Prasad, Bangalore (IN)

(73) Assignee: SAP SE, Walldorf (DE)

( * ) Notice: Subject to any disclaimer, the term of this patent is extended or adjusted under 35 U.S.C. 154(b) by 777 days.

(21) Appl. No.: 15/657,698

(22) Filed: Jul. 24, 2017

(65) Prior Publication Data

US 2019/0026635 A1    Jan. 24, 2019

(51) Int. Cl.

| | |
|---|---|
| *G06F 3/048* | (2013.01) |
| *G06N 5/04* | (2006.01) |
| *G07C 5/08* | (2006.01) |
| *G06F 16/9537* | (2019.01) |
| *G06F 3/01* | (2006.01) |

(Continued)

(52) U.S. Cl.
CPC .......... *G06N 5/04* (2013.01); *G06F 16/9537* (2019.01); *G07C 5/085* (2013.01); *G07C 5/0808* (2013.01); *G07C 5/0825* (2013.01); *G06F 3/0481* (2013.01); *G07C 5/008* (2013.01)

(58) Field of Classification Search
CPC .... G07C 5/008; G07C 5/0808; G07C 5/0816; G07C 5/06; G06F 3/0481
See application file for complete search history.

(56) References Cited

U.S. PATENT DOCUMENTS 9,202,317 B2 *  12/2015  Hosein ............... G06F 16/9535
2009/0322671 A1 *  12/2009  Scott ..................... G06F 3/012
                                                         345/156

(Continued)

OTHER PUBLICATIONS

"Ford accelerates electric vehicle battery testing with wireless monitoring systems." Jul. 4, 2012, http://www.reliableplant.com/Articles/Print/26218, 2 pages.

(Continued)

*Primary Examiner* — Nicholas Augustine
(74) *Attorney, Agent, or Firm* — Sterne, Kessler, Goldstein & Fox P.L.L.C.

(57) ABSTRACT

Disclosed herein are system, method, and computer program product embodiments for vehicular telematics with virtual-reality monitoring capabilities. An example system may establish a data connection to a plurality of sensors corresponding to at least one component of a vehicle, retrieve status information corresponding to the at least one component of the vehicle, from the plurality of sensors, send the status information retrieved from the plurality of sensors to a data set, receive at least one result of predictive analytics performed with the data set, and generate output via an interface. Other embodiments may additionally place requests for new parts or service based on the at least one result of the predictive analytics. The data set may be a structured database or an unstructured cluster. Big data analytics may use simulations for predictions. Output may leverage virtual reality or augmented reality to improve ease of use and intuitiveness for any role of users.

20 Claims, 17 Drawing Sheets

(51) Int. Cl.
*G07C 5/00* (2006.01)
*G06F 3/0481* (2013.01)

(56) References Cited

U.S. PATENT DOCUMENTS

| | | | | |
|---|---|---|---|---|
| 2013/0144482 | A1* | 6/2013 | Tuukkanen | B60R 1/00 |
| | | | | 701/29.6 |
| 2014/0176603 | A1* | 6/2014 | Kumar | G06F 3/011 |
| | | | | 345/633 |
| 2015/0309316 | A1* | 10/2015 | Osterhout | G06F 3/0346 |
| | | | | 345/8 |
| 2015/0371455 | A1* | 12/2015 | Abdel-Rahman | G06Q 10/20 |
| | | | | 701/29.1 |
| 2016/0084661 | A1* | 3/2016 | Gautama | G01C 21/365 |
| | | | | 701/400 |
| 2017/0129426 | A1* | 5/2017 | Smith | B60K 35/00 |
| 2017/0146801 | A1* | 5/2017 | Stempora | G06Q 10/063 |
| 2017/0337573 | A1* | 11/2017 | Toprak | G07C 5/006 |
| 2018/0060946 | A1* | 3/2018 | Devries | G06F 3/017 |

OTHER PUBLICATIONS

Dynetics, Inc., "Dynetics Remote Vehicle Data Monitoring," 2010, www.dynetics-ia.com, 2 pages.

* cited by examiner

| Search | BATTERY Type: TABLE | | | |
|---|---|---|---|---|
| ∨ Disk Engine | | | | Selected Rows: 1000 |
| ▭ BATTERY | ID▲ Data Type: STRING Constraints:NULL | TEMPERATURE△▽ Data Type: DECIMAL Constraints:NULL | VOLTAGE△▽ Data Type: DECIMAL Constraints:NULL | SOC△▽ Data Type: DECIMAL Constraints:NULL |
| ⚙ VEHICLE | ABC20160101 | 65.89 | 7.61 | 69.18 |
| > In-Memory Engine | ABC20160102 | 31.48 | 7.78 | 57.67 |
| > | ABC20160103 | 29.50 | 1.89 | 65.76 |
| | ABC20160104 | 72.92 | 6.58 | 86.32 |
| | ABC20160105 | 79.64 | 6.48 | 67.38 |
| | ABC20160106 | 80.01 | 7.69 | 60.71 |
| | ABC20160107 | 97.64 | 1.27 | 84.94 |
| | ABC20160108 | 34.91 | 4.67 | 34.31 |
| | ABC20160109 | 98.35 | 3.03 | 50.15 |
| | ABC20160110 | 65.48 | 5.39 | 39.18 |
| | ABC20160111 | 48.84 | 4.49 | 54.34 |
| | ABC20160112 | 46.00 | 7.92 | 53.86 |

FIG. 7

BIG-DATA DRIVEN TELEMATICS WITH AR/VR USER INTERFACES

BACKGROUND

As modern automotive systems and their respective components become increasingly more complex, their repairs and maintenance accordingly become increasingly more costly and difficult, requiring more expensive resources and more skilled labor, driving up total cost of ownership of new generations of modern vehicles.

This trend has held true over the last several decades with the gradual evolution and computerization of new automotive technology in conventional motor vehicles having internal combustion engine (ICE) powertrains. The same trend is becoming especially more apparent and accelerating with rapid adoptions of newer technologies involved with electric drive vehicles, including battery electric vehicle (BEV), fuel-cell electric vehicle (FCEV), and plug-in hybrid electric vehicle (PHEV) technologies, to name a few.

Aside from electric motors and dynamic or regenerative braking mechanisms, a key driver of complexity and cost is also the variety of electric storage components on board, which may wear out sooner than motors or braking mechanisms in electric vehicles, for example. Some specific types of these electric storage components may include batteries, fuel cells, and/or supercapacitors, depending on the type of electric vehicle involved.

New inefficiencies arise in customer service chains involving local or distributed service centers, along with more centralized manufacturers or vendors of vehicles and their respective components, as new vehicle components and subsystems become more difficult and expensive to maintain, repair, and replace. For example, it is not common for servicers and vehicle manufacturers or component vendors to have an established communication channel to share information regarding status and replacement of components, it tends to be difficult for manufacturers or vendors to monitor all status reports that end users may receive from specific components, and vehicle servicers often lack sufficient tools or resources to visualize technical data of vehicle components, especially for electric storage components.

Responding to these inefficiencies with conventional means may be excessively slow and cost-prohibitive. It may not be practical to return vehicles to centralized manufacturers or vendors only to replace batteries, for example, in that this approach may require excessive time and/or money. However, performing such service at distributed local service centers presently may require having at each local site a set of narrowly specialized tools and highly trained technicians, each of which significantly increase costs. Added risks of human error by technicians increase the likelihood of safety hazards for end users as well as driving product liability for servicers, vendors, and manufacturers.

Inefficiencies such as these tend to impede the adoption of new technology, such as new energy vehicle (NEV) technology, which may encompass any combination of electric vehicle technologies, and possibly other new technologies that may emerge later. Such barriers created by these inefficiencies, in turn, may further slow the later development of the next generation of NEV or related technology. If the NEV industry is subsidized, so as to encourage adoption and further research and development despite such inefficiencies, there would still be widespread costs to the public, as well as safety risks to vehicle occupants and bystanders. Solutions problems such as these, however, may be available by leveraging other fields of technology in novel, interdisciplinary problem-solving approaches.

BRIEF DESCRIPTION OF THE DRAWINGS

The accompanying drawings are incorporated herein and form a part of the specification.

FIG. 7 shows an exemplary web interface for viewing, browsing, and sorting through relevant data from various vehicle telematics modules, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
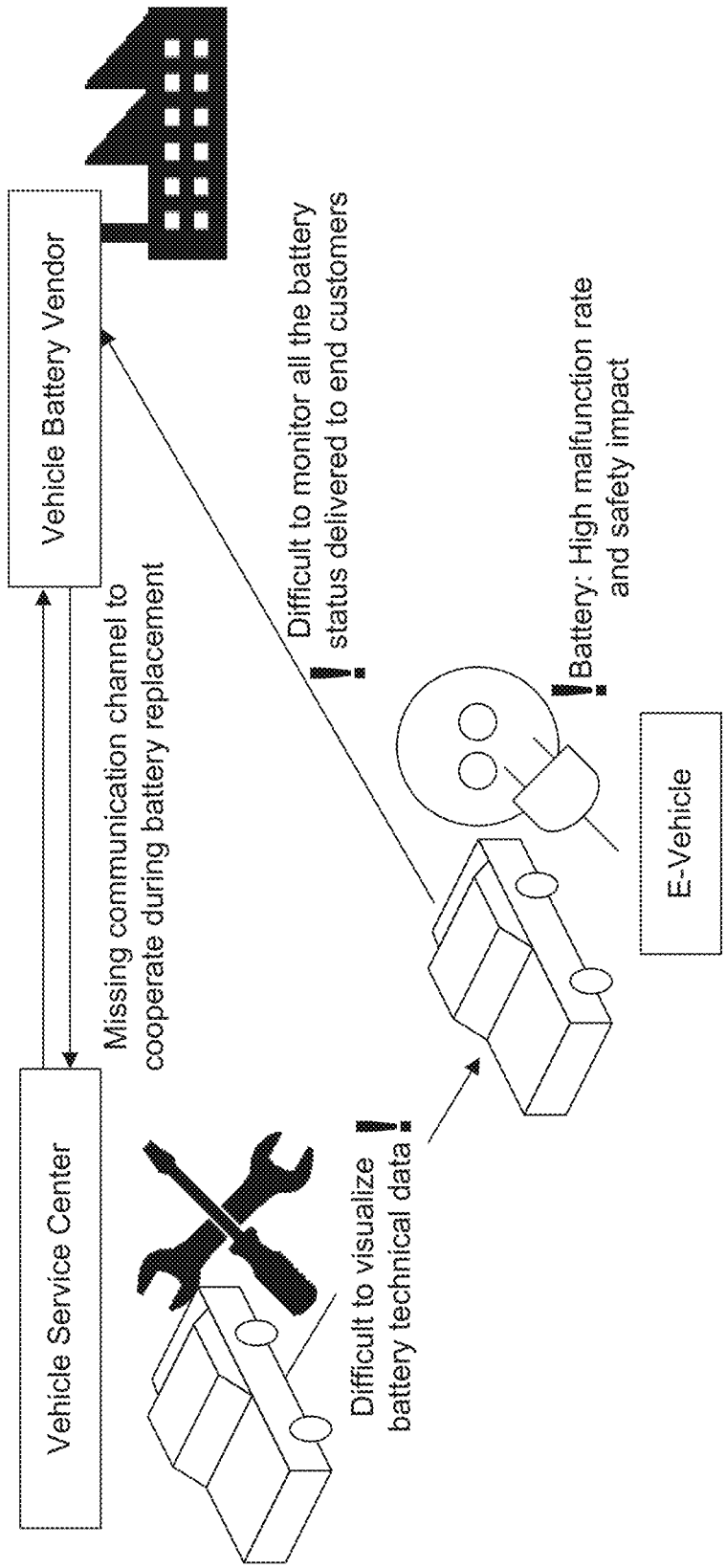
FIG. 1 depicts problems with conventional methods as applied to certain new vehicle technologies, such as battery electric vehicles.

Provided herein are system, method and/or computer program product embodiments, and/or combinations and sub-combinations thereof, for big-data driven telematics with augmented reality or virtual reality user interfaces.

Inefficiencies surrounding new technologies, such as those described in the Background section above, may be addressed in a meaningful way using other new technologies, for example, in the way of smarter devices and smarter components, clearer reporting of vehicle and component status to technicians and end users, and improved data analytics and sharing of information across networks of vehicles, servicers, vendors, and manufacturers.

In many of the exemplary embodiments described herein, battery electric vehicle (BEV) technology is shown using lithium batteries, only as a familiar example that is not in any way limiting. Additionally, the term "vehicle" as used herein may refer to virtually any means of transportation, including aircraft, spacecraft, watercraft, hovercraft, and wheeled vehicles for use on land, water, and/or other similar environments, to name a few non-limiting examples. Such a vehicle may be powered by any power source, may store and consume any type of fuel, may utilize any means of propulsion. Vehicles may be employed for any use, such as private personal use, commercial use, industrial use, military use, etc.

Any on-board components of a vehicle may be used for or with any telemetry and/or telematics means described herein. Other monitoring may be effected indirectly via remote apparatus or systems such as Global Positioning System (GPS) technology or similar technology for navigation, geolocation, timing, telemetry, and/or communication, to name a few non-limiting examples.

Any communications infrastructure may be used to establish a link (ideally following cybersecurity best practices for IoT and privacy) between on-board sensors, tags, and telemetry/telematics devices, and from those to outside infrastructure, service stations, vendors, manufacturers, cloud-based data backup sites, and so on. Some examples include radio-frequency identification (RFID), near-field communication (NFC), Bluetooth, Bluetooth Low Energy (Bluetooth LE or BLE), Wi-Fi (IEEE 802.11), just to name a few short-range wireless standards. Longer-range wireless communications may be achieved over GPRS/EDGE, 2G, 3G, 4G, LTE, 5G, and newer mobile wireless communications and data packet radio communication standards, in some embodiments. Alternatively, outside of any standard, virtually any type of propagation of wireless electromagnetic signals may be used.

In some other embodiments, wired connectors may be used, such as over various parallel or serial ports, Ethernet, or other wired networking protocols. Some examples of wired serial data exchange protocols include, for example, RS-232, USB, IEEE 1149, IEEE 1394, PCIe, DisplayPort, etc., to name a few standards.

If real-time data feeds are not necessary or are impracticable, data may be stored and later transferred over the same wireless or wired media, or may be moved on removable media, such as discs (magnetic or optical), cards (any medium), or by any other means of non-volatile data storage. In such exemplary embodiments as these, data should be regularly synchronized and backed up manually or by semi-automated processes.

In a purely illustrative example, looking at three important subsystems of modern BEVs, in this instance, the lithium-ion battery cells used to store electricity form one important electric subsystem in a BEV, alongside electric motor(s) and electronic control subsystem(s). Of these, lithium-ion batteries and their component modules of cells, tend to have the highest rates of malfunction as compared with motors and controllers, given that each battery each module may further include its own electronic controller(s) and separate mechanical parts.

In practice, to rectify a malfunctioning battery, one may opt to replace the whole battery, being the entire array of all battery modules in a BEV. This approach may be the quickest in terms of total downtime for the vehicle, but it may be inconvenient, in that it typically requires that the vehicle be returned to its manufacturer or vendor, and the process may be relatively costly, inefficient, and environmentally unsound.

Another approach to battery repair would be more modular, simply replacing worn-out or defective battery modules. This approach may also have the advantage of a relatively short downtime and greater efficiency, but it is still quite expensive, as it may require special service centers or dealerships to charge a premium for the highly-skilled labor required to effect this type of repairs.

A third approach to battery repair, the most efficient of those listed here, would be to replace individual cells within battery modules as needed. Cells are the core components of lithium-ion battery modules. However, this type of procedure is the most involved, requiring the most highly-trained labor and specialized capital, even rarely found at specialty service centers and high-end dealerships. As a result, this type of operation, in practice, may only be performed at a manufacturer or highly-sophisticated vendor facility, and is therefore roughly as impractical and/or inefficient as sending the vehicle back to a manufacturer or vendor for an entire battery replacement.

Simply knowing these advantages and drawbacks of conventional methods may not be sufficient to overcome these challenges in after-market service for NEVs, especially as adoption of NEVs rapidly increases in the future. To tackle these problems, various exemplary embodiments are proposed herein to leverage various fields of computing, such as big data, forecast analytics, visualizations for virtual reality (VR) and/or augmented reality (AR), automated testing and diagnostics, and supply chain management, so as to ensure better quality, reliability, and accessibility of NEV maintenance and repairs, even at local after-market repair shops and service centers locally accessible to many new NEV owners.

FIG. 1 depicts problems with conventional methods as applied to certain new vehicle technologies, such as battery electric vehicles.

As can be understood from the Background section above, solving problems of new technology using conventional methods can introduce new pain points if the conventional methods cannot easily scale to new constraints and other unique aspects of the new technology. As shown with reference to FIG. 1, it is not very common for servicers and vehicle manufacturers or component vendors to have an established communication channel to share information regarding status and replacement of components. To name one reason, for example, this may be because many such servicers do not enter into contractual relationships with every vehicle manufacturer or vendor. As another reason for difficulties in this area, it may be impractical for servicers to enter into such relationships, as well as for such authorized servicers to be universally accessible for all vehicles, as especially may be the case for many NEVs.

It also tends to be difficult for manufacturers or vendors to monitor all status reports that end users may receive from specific components. The volume of data to be collected may be too great for any one vendor or manufacturer to collect and analyze reliably at all times. Even designing for such big data, collecting this data in one place may depend on other third-party infrastructure beyond the control of a single vendor or manufacturer.

As another hindrance to affordable and reliable service, vehicle servicers often lack sufficient tools or resources to visualize technical data of vehicle components, especially for electric storage components. This may be the case especially for servicers, engineers, mechanics, and other technicians, who may not have all the most complete and up-to-date training in diagnostics, maintenance, repairs, replacement, and other services relating to NEVs including any of BEVs, FCEVs, PHEVs, etc.

Additionally, it may not be practical to return vehicles to centralized manufacturers or vendors only to replace batteries, for example, in that this approach may require excessive time and/or money. However, performing such service at distributed local service centers presently may require having at each local site a set of narrowly specialized tools and highly trained technicians, each of which significantly increase costs. In any case, added risks of human error by technicians increase the likelihood of safety hazards for end users as well as driving product liability for servicers, vendors, and manufacturers.

Figure 2:
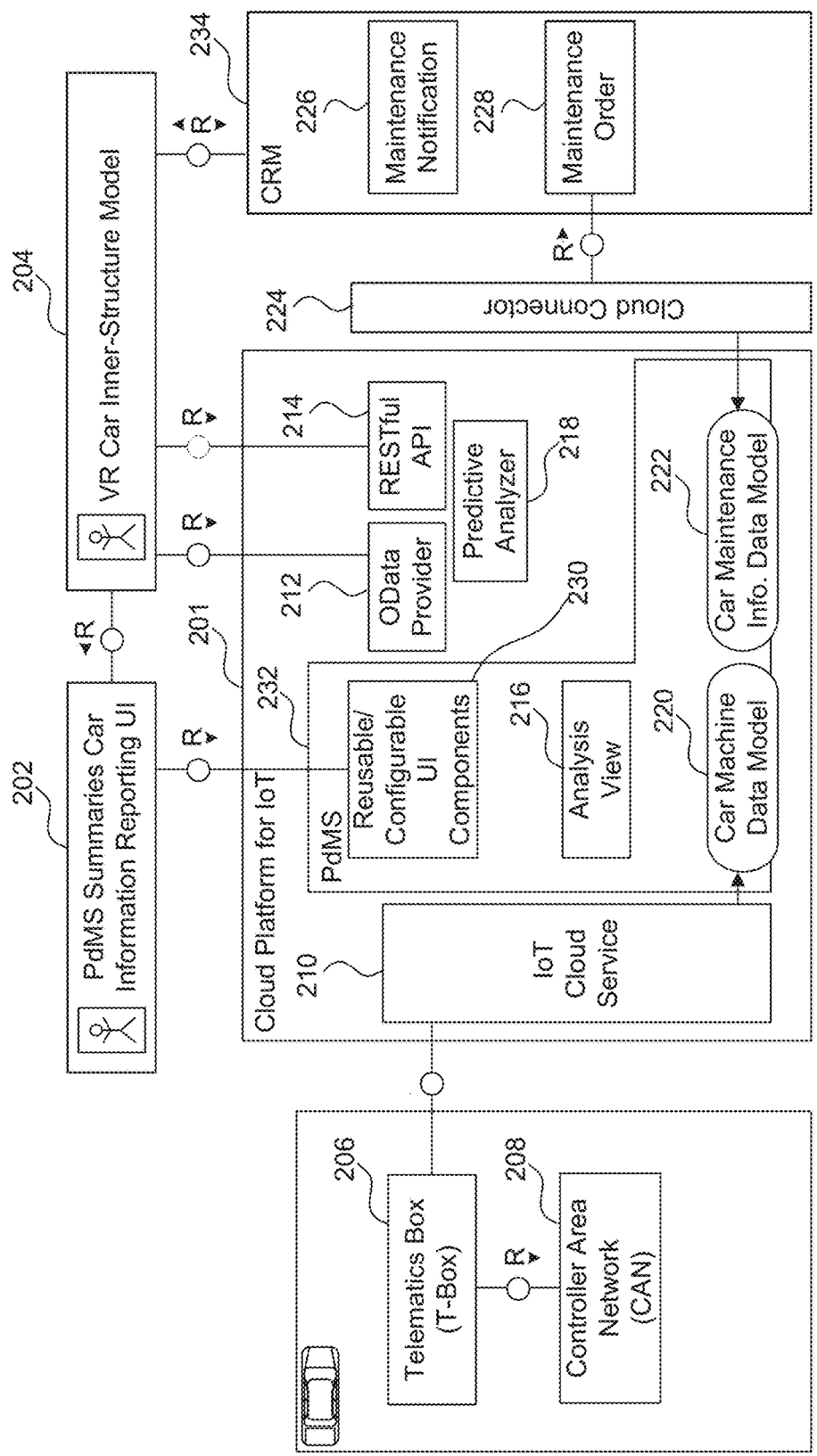
FIG. 2 is a block diagram an architectural overview of an Internet-of-Things (IoT) cloud platform integrating management of vehicle telematics data, analytics, and output for users including technicians and end users, according to an example embodiment.

FIG. 2 is a block diagram an architectural overview of an Internet-of-Things (IoT) cloud platform integrating management of vehicle telematics data, analytics, and output for users including technicians and end users, according to an example embodiment.

As a general overview of the approach taken in this example, by using IoT solutions, in-memory database platform(s), and advance visualization technology such as VR or AR, an embodiment may begin with sensor data collection, health status prediction, dynamic vehicle VR model status update(s), and then on to drill-down analysis, before triggering maintenance request(s) and/or notification(s). During a repair process, central monitoring users and/or any local technicians may leverage the VR model to try different module replacement solutions. After the physical repair, central monitoring users may also use the VR model to test new battery subsystems or test the entire vehicle after the repair process to ensure maintenance quality, safety, and reliability.

Starting with collecting data from sensors, telematics box (T-box) 206 and controller area network (CAN) may be equipped on board a vehicle, collecting operational information such as battery operation parameters, engine status, tire pressure, and similar information that may be collected by a CAN on a CAN bus (not shown). This information, which may be telemetry data or telematics data, may be transmitted to other receivers, local to the vehicle, such as using short-range wireless or wired communications, or sent to a remote receiver, such as using longer-range wireless communications. In the latter example, the T-box 206 and/or CAN 208 may communicate directly with a remote receiver, or may communicate with a local receiver intermediately that will then relay the telemetry or telematics data to a remote receiver, using the same wireless communication protocols or different protocols.

As part of an IoT cloud platform 201, sensor data from T-box 206 and/or CAN 208 would ultimately be transmitted via IoT cloud service(s) 210 to a predictive maintenance system (PdMS) 232. PdMS 232 may include a user interface (UI) having UI components that are reusable and/or configurable, as reusable/configurable UI components 230, which may interface with PdMS summaries car information reporting UI 202. PdMS 232 also may integrate with a car machine data model 220, specific to a vehicle, and car maintenance information data model 222, as a more general template for service. PdMS 232 may also generate analysis view(s) 216, for drill-down analysis derived from telemetry/telematics data.

Such analysis view(s) 216 may be built using a predictive analyzer 218, which may include modules and/or libraries implementing scalable big-data analytics with predictive algorithms, according to some embodiments. Predictive analyzer 218 may be tunable, adaptable, and/or self-modifying, in some example embodiments, such as for data mining, anomaly detection, structured prediction, and/or deep learning applications, to name a few non-limiting examples.

In conjunction with the data processing capabilities in the backend delivering meaningful analysis to real-world data collected from the IoT devices linked with the vehicle's on-board T-box 206 and CAN 208, VR car inner-structure model 204 may facilitate rendering of corresponding physical aspects of vehicles and their components, and may interface with the reporting UI 202 to integrate the physical rendering with relevant sensor data and analysis. The inner-structure model interfaces with the IoT cloud platform 201 via any of a variety of RESTful web services with RESTful API 214, or via other integrated platforms such as an OData provider 212, conforming to the Open Data Protocol, which may similarly provide its own RESTful APIs separate from RESTful API 214.

Relevant systems may also interface with customer relationship management (CRM) 234 backend(s), which may be useful for providing maintenance notification(s) 226 and placing maintenance order(s) 228 for parts and service. These notifications and orders may be customer-facing and/or internal for engineers, mechanics, technicians, and other service professionals and providers. CRM 234 platforms may also interface with the IoT cloud platform, in some embodiments, via a cloud connector 224 interface, which may further comprise an application programming interface (API) (not shown).

Figure 3:
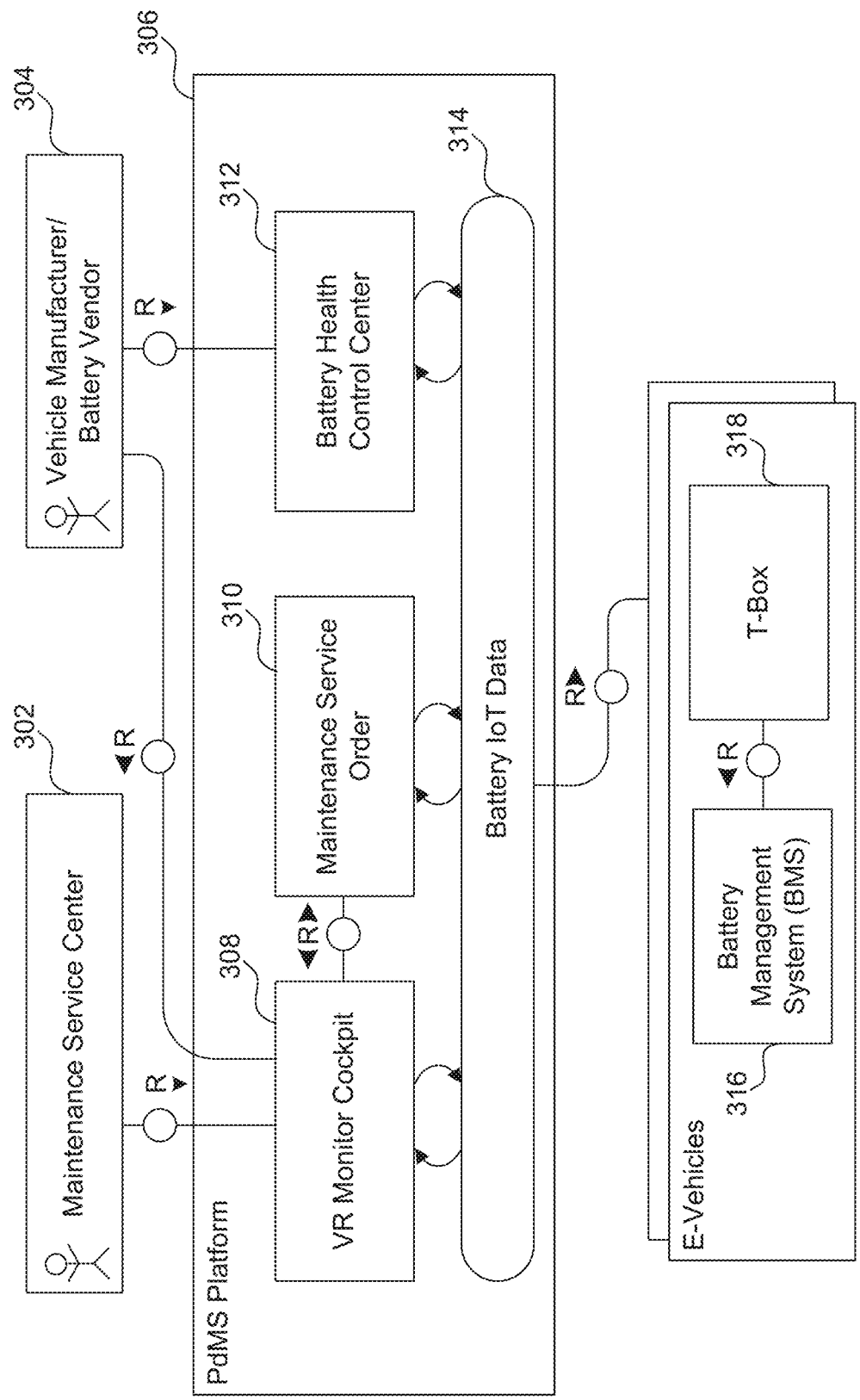
FIG. 3 shows a high-level architecture block diagram of a predictive maintenance system (PdMS) platform, according to an example embodiment.

FIG. 3 shows a high-level architecture block diagram of a PdMS platform, according to an example embodiment.

This illustrative example in FIG. 3 demonstrates one way in which maintenance service center(s) 302 and vehicle manufacturer(s) and/or battery vendor(s) 304 may interface with and access relevant IoT data 314 via various components 308-312 of a PdMS platform 306. Relevant IoT data 314 may further include battery data, in the example case of a BEV, which may include at least a T-box 318 and a battery management system (BMS) 316.

Of the various components 308-312 of PdMS platform 306, battery health control center (BHCC) 312 may be utilized to track any parameters relevant to battery health, such as temperature, charge capacity, wear and wear curves over time, etc. BHCC 312 may trigger notifications and maintenance service order(s) 310, which may work with a corresponding component of CRM, as shown in FIG. 2, element 228, or may function independently. VR monitor cockpit 308 is available to servicers, manufacturers, and vendors 302-304 such that any diagnosis, testing, or similar service may be performed remotely, and that these parties, if responsible by warranty or other contractual duty, for example, may stay informed of the status of any given vehicle and also follow up with service calls to the owner and/or operator of such vehicle(s).

Figure 4:
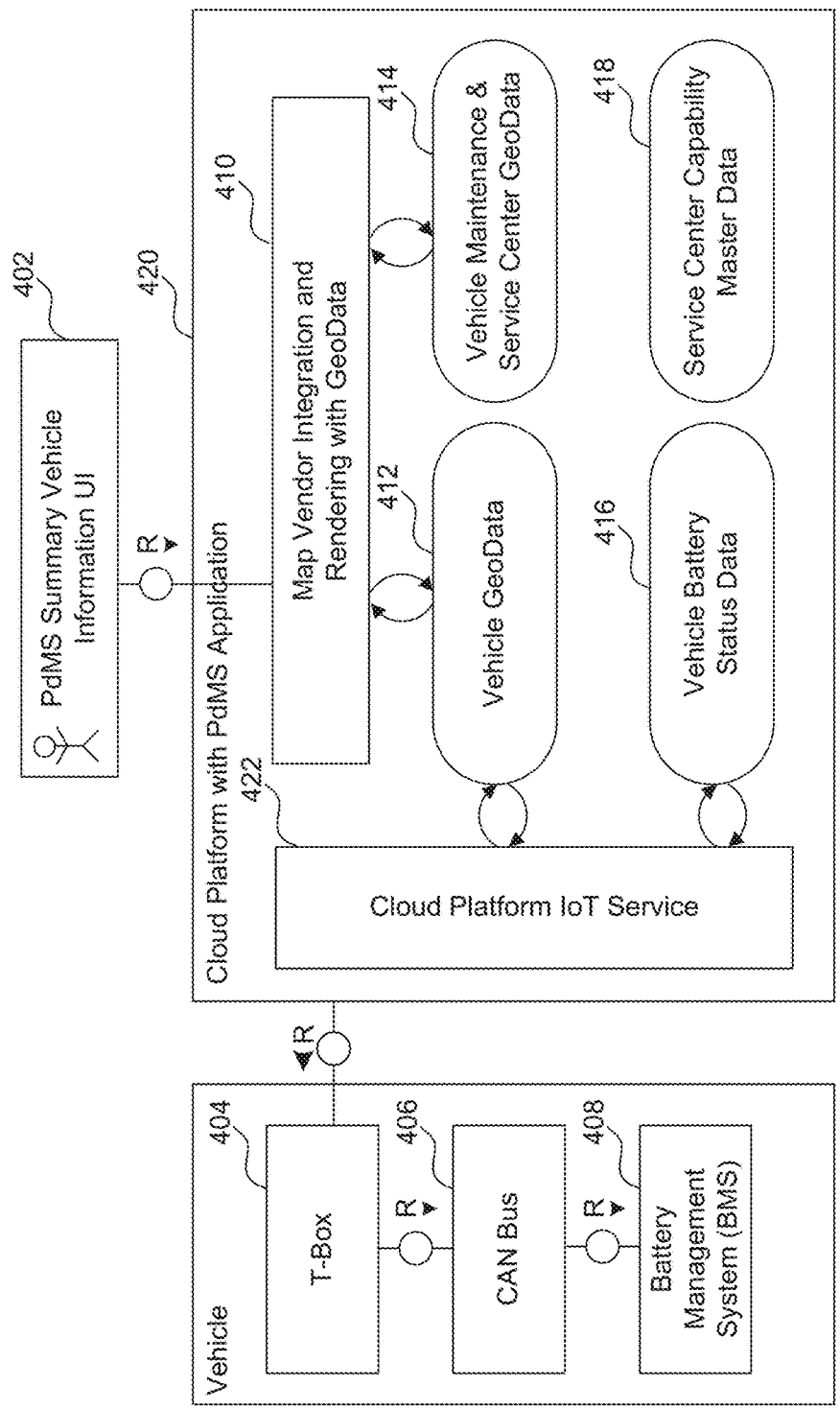
FIG. 4 shows a block diagram representing a technical implementation of the IoT cloud platform running with a PdMS application, according to an example embodiment.

FIG. 4 shows a block diagram representing a technical implementation of the IoT cloud platform running with a PdMS application, according to an example embodiment.

This example shown in FIG. 4 presents an additional configuration of a cloud platform with a application 420. This cloud platform with PdMS application 420 still interfaces with IoT devices in vehicle(s) via cloud platform IoT service 422, which in turn interfaces with vehicle(s) at least via T-box 404, which further connects to BMS 408 via CAN bus 406.

It is worth noting here that in configurations such as those of FIGS. 2-4, in which IoT devices, sensors, buses, and services, such as CAN, CAN bus, BMC, BMS, etc., are set up in the vehicle behind T-box, and only T-box interfaces with IoT cloud platforms and services, in these example embodiments referenced herein. Such a configuration may offer improved security for IoT devices on board connected vehicle(s), and may even be mandatory for compliance with certain security requirements and regulations. However, other steps may be taken locally to secure wireless and wired control transmissions and data transmissions to and from on-board MT devices, including shielding, hardening, encryption, etc.

Some features of this additional configuration include abilities to coordinate IoT sensor data collected from vehicle(s) 416 with geolocation data of the vehicle(s) 412, and further provide context to the vehicle(s) regarding locations of vehicle maintenance/service centers 414, cross-referenced against service center compatibility master data 418. All of this location information may be neatly packaged and integrated with map vendors (e.g., GOOGLE MAPS®, MAPQUEST®, APPLE MAPS®, GARMIN®, YAHOO! MAPS®, TOMTOM®, BING MAPS®, etc.) for rendering maps with relevant information presented to an end user via PdMS summary vehicle information UI 402, in this exemplary embodiment.

Figure 5:
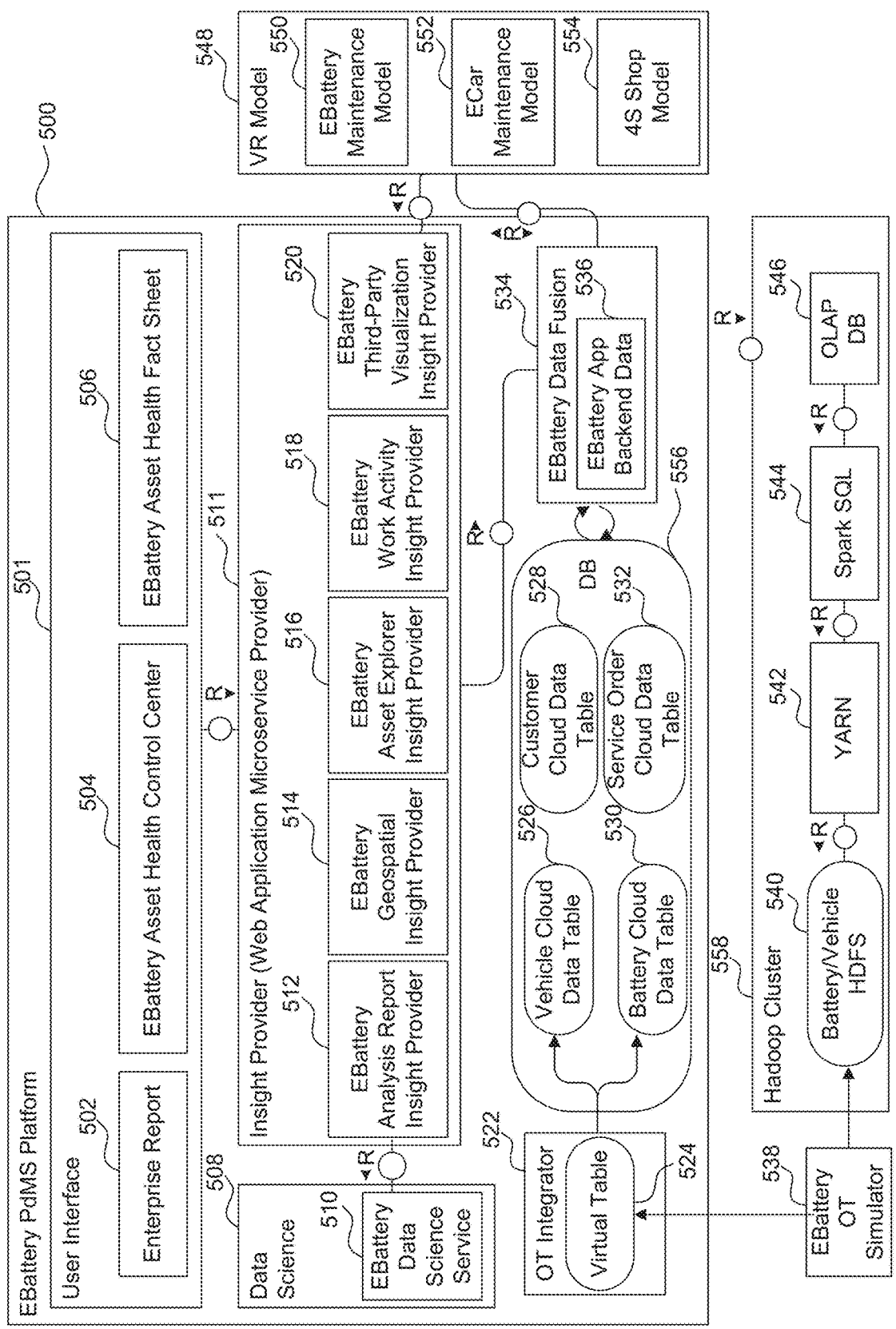
FIG. 5 is a block diagram of a technical implementation of the PdMS platform for electric vehicle batteries, according to an embodiment, further including big data architecture with operational technology integration and VR modeling.

FIG. 5 is a block diagram of a technical implementation of the PdMS platform for electric vehicle batteries, according to an embodiment, further including big data architecture with operational technology integration and VR modeling.

In this non-limiting example embodiment of a PdMS platform 500 specifically for BEV batteries, a user interface 501 may be included, further including modules around an asset health control center 504 to generate enterprise report(s) 502 and asset health fact sheet(s) 506. Data science module 508 may provide a general data analytics framework, with a specially customized data science service 510 for BEV battery data analytics.

The data science module 508 may interface with an insight provider 511 as a framework for web application microservices that communicate with backend data pertaining to, for example, batteries and their maintenance and care. This insight provider microservice may have its own insight provider modules for more specific functions, such as an analysis report module 512, geospatial data module 514, asset explorer module 516, work activity module 518, third-party visualization module 520, etc., according to a non-limiting example embodiment depicted herein.

The insight provider third-party visualization module 520 may interact with VR model module 548, which in turn may handle sub-models for VR views, such as for facilitating battery maintenance 550, vehicle maintenance 552, or 4S shop 554 models specific to 4S service-level dealerships, as described below with reference to FIG. 9. The VR model module 548 may also interact with a data fusion module 534, which may, in some embodiments, be specifically configured to work with backend data 536 accessible through battery web services and applications for BEV batteries, for example. The data fusion module 534 may also provide data to insight provider 511 microservice, in this case, as may pertain to exploring and analyzing battery data.

Interacting with data fusion module 534 is also a database module 556, which may further include tables from cloud database services, for example, vehicle cloud data table 526, customer cloud data table 528, battery cloud data table 530, and service order cloud data table 532, to name a few non-limiting examples. Tables within the database module 556 may be populated with raw data and analyzed or processed data, through a virtual table 524 within an operational technology (OT) integrator 522.

OT integrator 522 is configured to interact with OT simulator 538, which may be helpful in making determinations for operational recommendations to technicians, such as whether to replace a battery, module, cell, or in deciding what other action to take, for example. OT simulator 538 may also interact with Hadoop cluster 558, which may include unstructured data in a big-data architecture, such as including a Hadoop distributed file system (HDFS) 540 for storing large amounts of vehicle and battery data, for example, in some embodiments.

This architecture may be further configured to operate with a toolchain, additionally including Hadoop's "yet another resource negotiator" (YARN) module 542, to manage cluster computing resources and scheduling, Spark SQL module 544, to allow some SQL support even for data sets or data stores of limited structure as in Hadoop cluster 558, and also may include online analytical processing (OLAP) database module 546, where needed. Each of these modules in this Hadoop cluster toolchain may be interactive with other stages of the toolchain or parts of the Hadoop cluster 558, but may also have some functions apportioned into exclusive domains, as with domain-specific languages, for example. Although a Hadoop cluster 558 may be used in this exemplary embodiment, other unstructured data storage systems may be used for comparable high-throughput architectures or layers, such as in a lambda architecture.

Together, in this embodiment, this combination of modules with this architecture thereby allows target users (technicians) to visualize operational technology data from complex product structures in BEV battery health monitoring and failure-handling processes, via an intuitive VR approach. By allowing OT data from the user VR cockpit to information-technology backend systems to be vertically integrated in this manner, such architectures enable end-to-end support across virtual reality into physical reality, by a greater number of less-skilled technicians in a more distributed support workforce. This arrangement may be advantageous for manufacturers and vendors in the market space of NEVs, and may be moreover essential to support explosive growth of NEV markets as NEVs become more affordable and accessible to greater numbers of ordinary consumers.

Figure 6A:
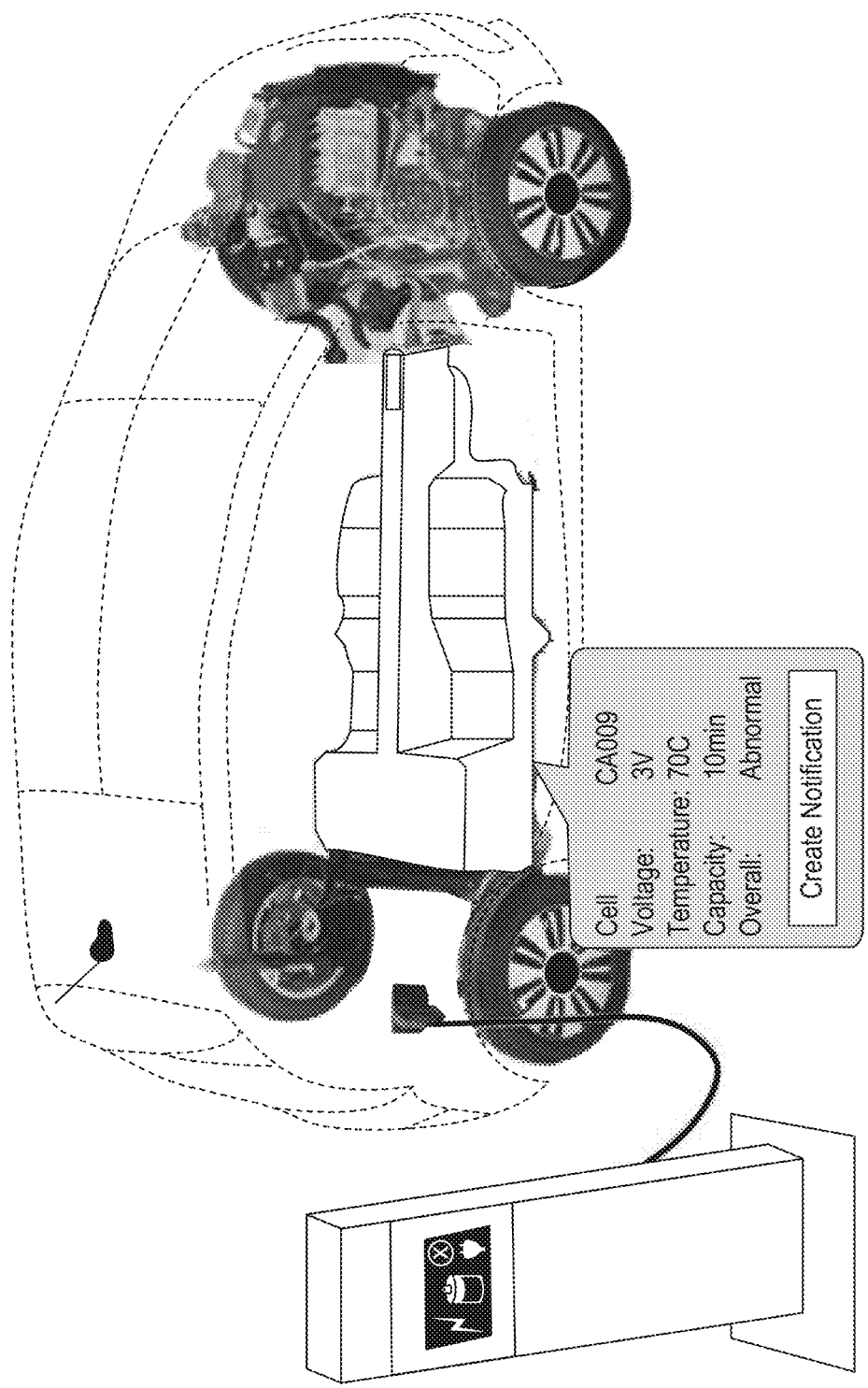
FIGS. 6A-6C show views of some monitored components of an electric vehicle, according to an embodiment, including pop-up and drill-down data with notifications.
Figure 6B:
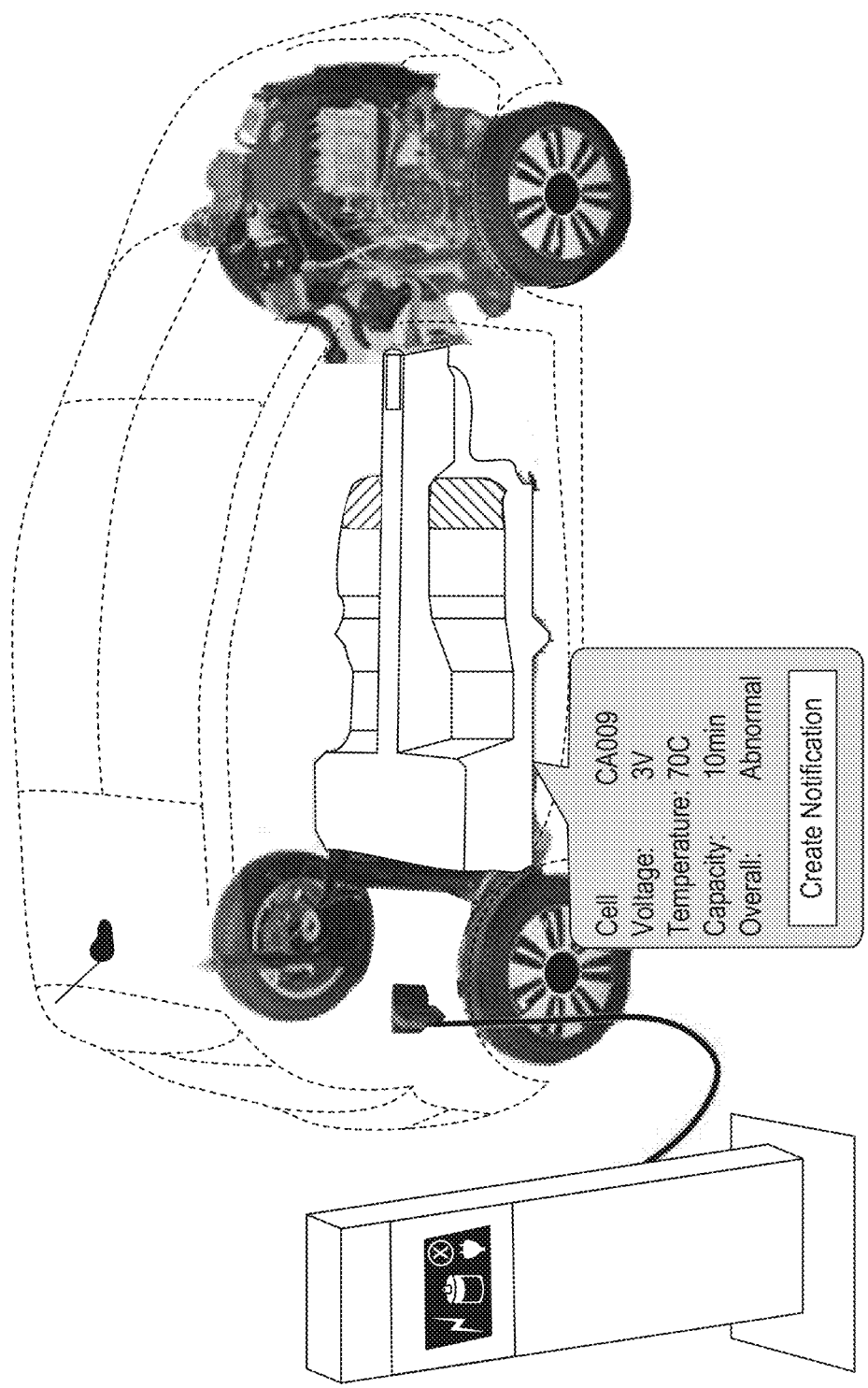
Figure 6C:
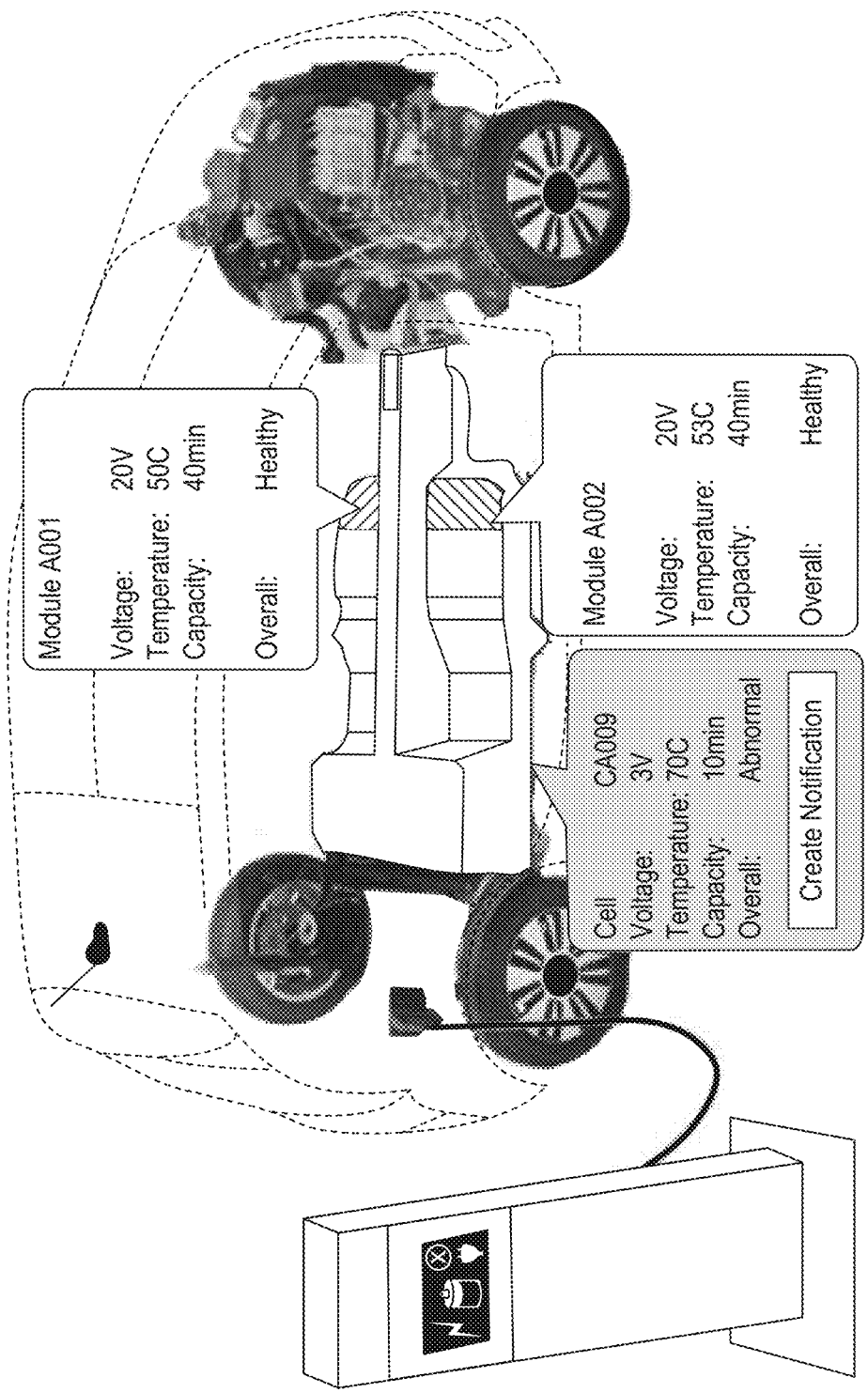

FIGS. 6A-6C show VR views of some monitored components of an electric vehicle, according to an embodiment, including pop-up and drill-down data with notifications.

In FIG. 6A, a VR view of battery components in a vehicle is displayed. Other parts of the vehicle, such as the outer body, may be hidden or made significantly more transparent than normal, in order to enable a user to see other components of interest. Here, in this example of FIG. 6A, one can see only a faint outline of a car body, revealing a battery assembly underneath. A pop-up balloon is displayed, showing status information pertaining to a particular cell malfunctioning. In this example embodiment, the balloon may be of a certain color to indicate a malfunction or overall abnormal state.

Additionally, in 6A, there is an option, such as in the form of a button, to create a notification, such as to an end user or to another technician, to provide notice of the malfunctioning component, in this particular embodiment. In some embodiments, the button may be to request or order service or parts to maintain, repair, or replace worn, damaged, or defective parts, for example. Additionally, in other embodiments, such requests and/or orders may be placed automatically, and the "button" space may be a different type of notification to alert a user that a request or order has been placed and/or is pending, with status updates, etc., to name a few non-limiting examples.

In FIG. 6B, other components are highlighted, such as battery modules at the front of the battery assembly. This highlighting could be triggered by a variety of events, such as arbitrary selection by a user, as in this case, or to highlight any other set of conditions applied to sensor data. For example, modules and/or cells could be automatically colored in a temperature gradient to show hot spots in the battery assembly. Color gradients could also be used to show voltages, ages, and/or levels of wear, to name a few non-limiting examples. Other variations could be used besides color or hue, e.g., saturation, brightness, shading, blinking, flashing, or other temporal variations or oscillations may also be used, in some non-limiting exemplary embodiments.

In FIG. 6C, the highlighted components are selected for drill-down analysis, revealing new pop-up balloons showing status information pertaining to the selected components, in this case, the battery modules that were highlighted by selection in the example depicted in FIG. 6B above. The features demonstrated in this drawing of FIG. 6C should be self-evident. In this example, for "healthy" components, the drill-down pop-up balloons are configured to display voltage, temperature, and capacity (in the form of estimated time remaining). In an actual implementation, these pop-up balloons may be configured to display virtually any type of information, both collected directly from on-board sensors and/or as a result of big-data analytics or predictions, such as from PdMS or other cloud services, databases, clusters, etc.

FIG. 7 shows an exemplary web interface for viewing, browsing, and sorting through relevant data from various vehicle telematics modules, according to an example embodiment.

This embodiment may be one of many possible ways to interface with, manipulate, search, sort, browse, and otherwise access the underlying data and analysis from PdMS and related platforms and applications. The possible configurations for such an interface are virtually limitless. Alternative configurations may be further explored as follows:

Regarding underlying platform technology, in an embodiment, there may be a GUI display and web browser, including charts or graphs and user interface for selection, de-selection, search, sort, and related actions, may be part of software on computer system 1500, described in greater detail below with respect to FIG. 15, which may be integrated with or communicatively coupled to a display device (not shown). The software may be a native application, modular or separately installed from an operating system, or alternatively integrated with an operating system running on computer system 1500, or otherwise bootable on computer system 1500, in some embodiments. The software may be executed and run alongside other software in a multitasking environment. In some embodiments, the software may be, or may be part of, a web application running in a web browser or comparable software platform. The application may execute entirely in a web browser, including some embodiments as a progressive web application (PWA). In other embodiments, the application may be a hybrid application, executing parts of program code both within a web browser or comparable software platform runtime environment, and executing parts of program code natively on the underlying computer system 1500.

Figure 8:
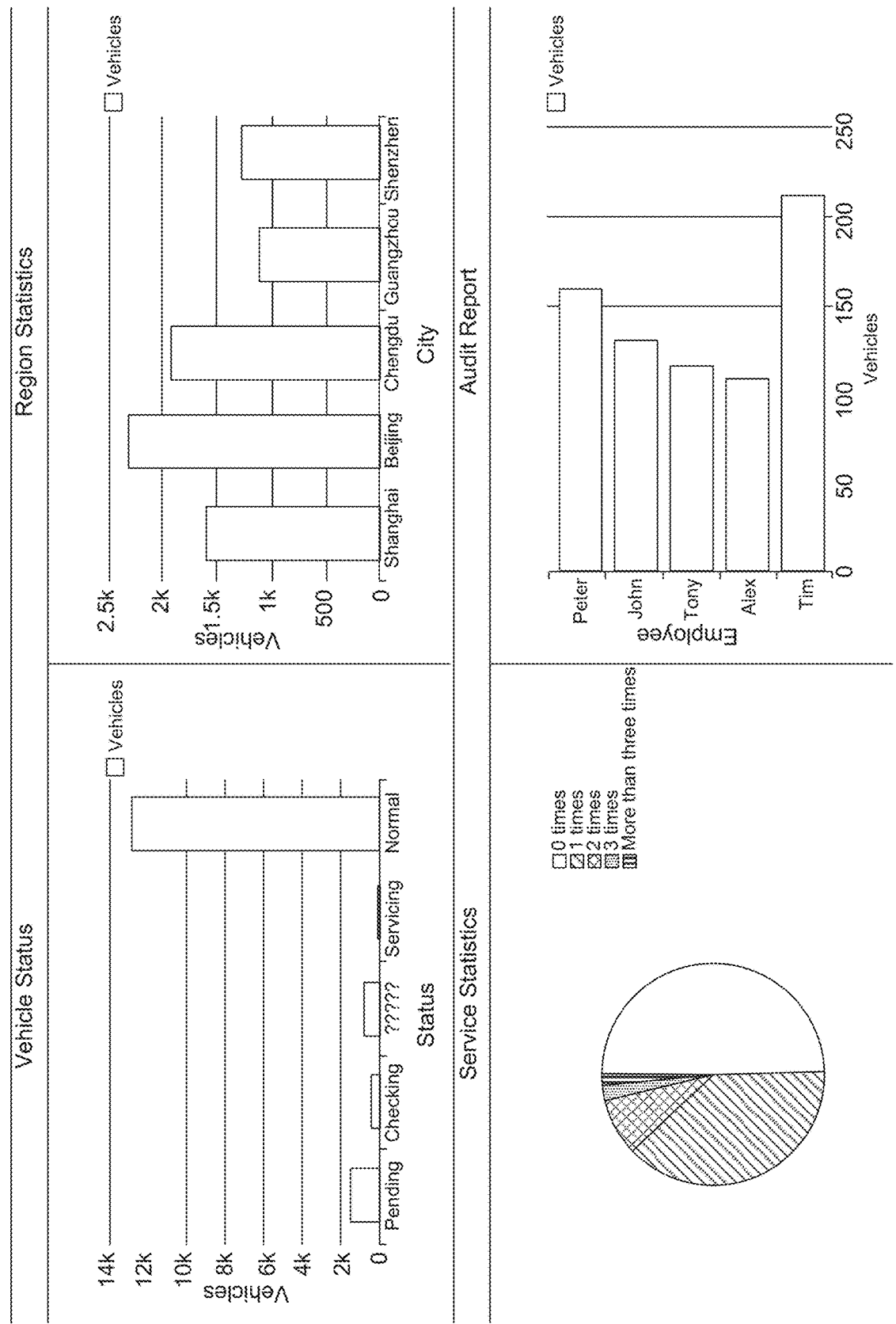
FIG. 8 shows additional visualizations of selected telematics data after collection, processing, and other analytics have been performed, according to an example embodiment.

FIG. 8 shows additional visualizations of selected telematics data after collection, processing, and other analytics have been performed, according to an example embodiment.

In addition to the web-based, native, hybrid, and progressive embodiments explored in the exemplary embodiment(s) represented in FIG. 7 above, FIG. 8 may be suited for native applications on large-format touch screens, in addition to pop-up or heads-up displays (HUD) present in virtual displays in a VR or AR environment. The output shown in FIG. 8 shows results of more complex data analytics than what is shown in FIG. 7. These charts and graphs may not be mere passive images, but may, in some embodiments, be interactive, allowing a user to drill down further into bars of a bar graph, for example, or segments of a pie chart, in other embodiments, to uncover further underlying data, analysis, and other parameters.

Figure 9:
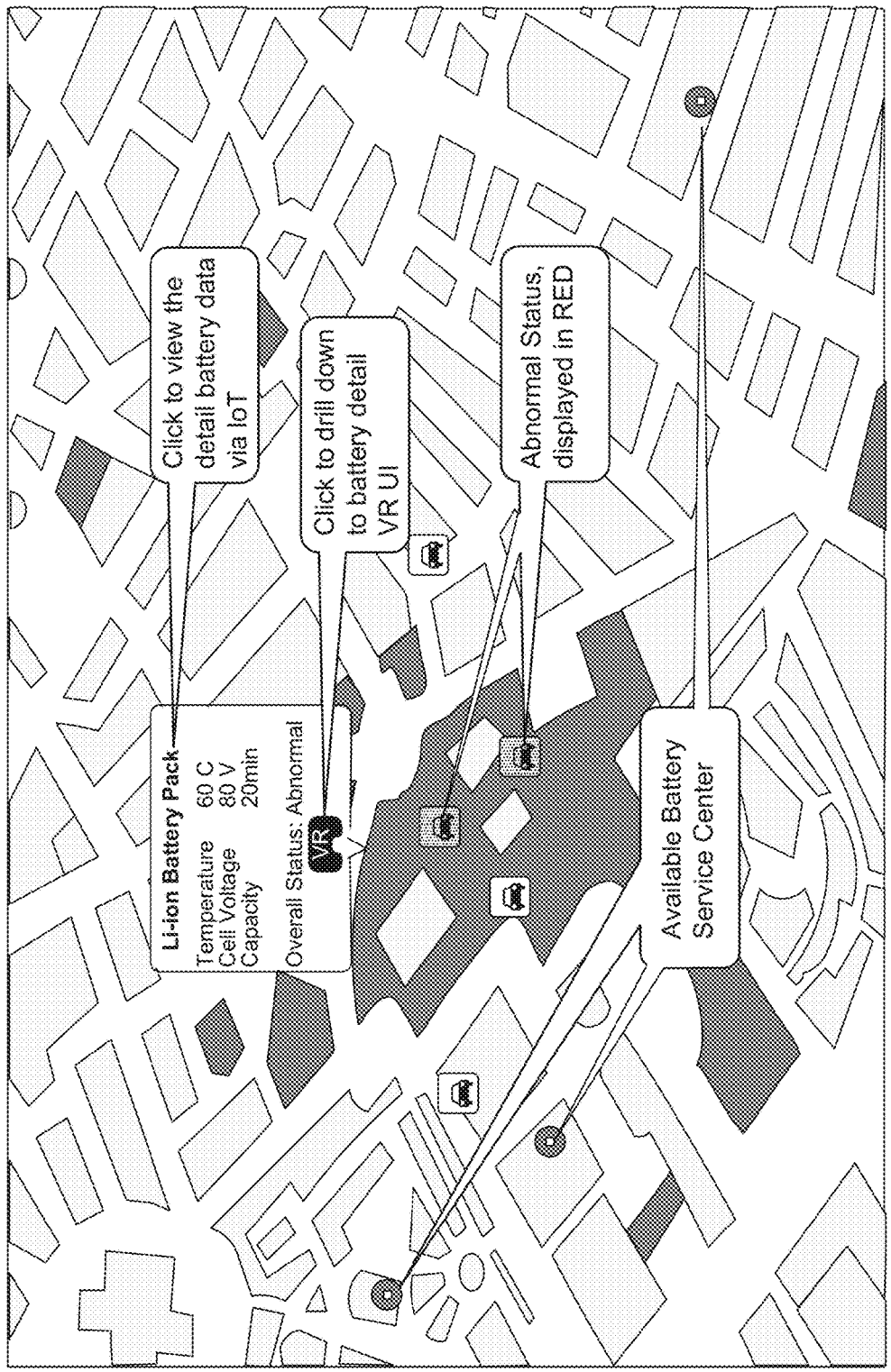
FIG. 9 represents a map within a display interface, according to an example embodiment, in which relevant locations may be displayed with additional information.

FIG. 9 represents a map within a display interface, according to an example embodiment, in which relevant locations may be displayed with additional information.

The map of FIG. 9 is shown with detailed overlays on a view that is predominantly occupied by the map itself. The map may be generated using the exemplary embodiment of FIG. 4, in some non-limiting examples. On this map, as with FIG. 8, the map, overlay analysis, and various indicator bubbles and pop-ups may be further selected and drilled down, revealing more useful data once a particular item has been selected. For example, by selecting one of the available battery service centers, more information may pop up about it, such as street address, service hours, telephone number and other contact information, etc.

As with the service center compatibility master data 418 of FIG. 4, the results displayed on the map may be automatically filtered for compatibility with the vehicle in which the map may be displayed, according to some example embodiments. There may also be special indicators noting presence of VR/AR diagnostics capability, PdMS capability, etc. In some cases, it is possible that even if a certain service center may service certain vehicles, it may not service specific battery modules and/or cells that may be used in some of those certain vehicles. Service center compatibility master data 418 may track all this information as relevant in some embodiments. Similarly, it may be possible in some embodiments to track and filter available service providers by service levels and guarantees. For example, a vehicle manufacturer or owner may prefer or require that service be handled in a "4S" dealership, conforming to a business model of "sales, service, spares, and surveys," ensuring higher quality guarantees and customer experience over the course of vehicle ownership. A user of the map of FIG. 9, if so desired, could limit displayed service centers to show only 4S dealerships, for example.

Maps such as the one displayed in FIG. 9 may also be used by technicians in service centers, vendors, or manufacturers, to track issues with existing deployments of their batteries or other vehicular components. Such a map may appear in a VR monitor cockpit 308 such as that of FIG. 3, for use by technicians or other service specialists. Such maps, overlays, and contextual information may also be dynamically updated as new data are collected and as new analyses are performed.

Figure 10:
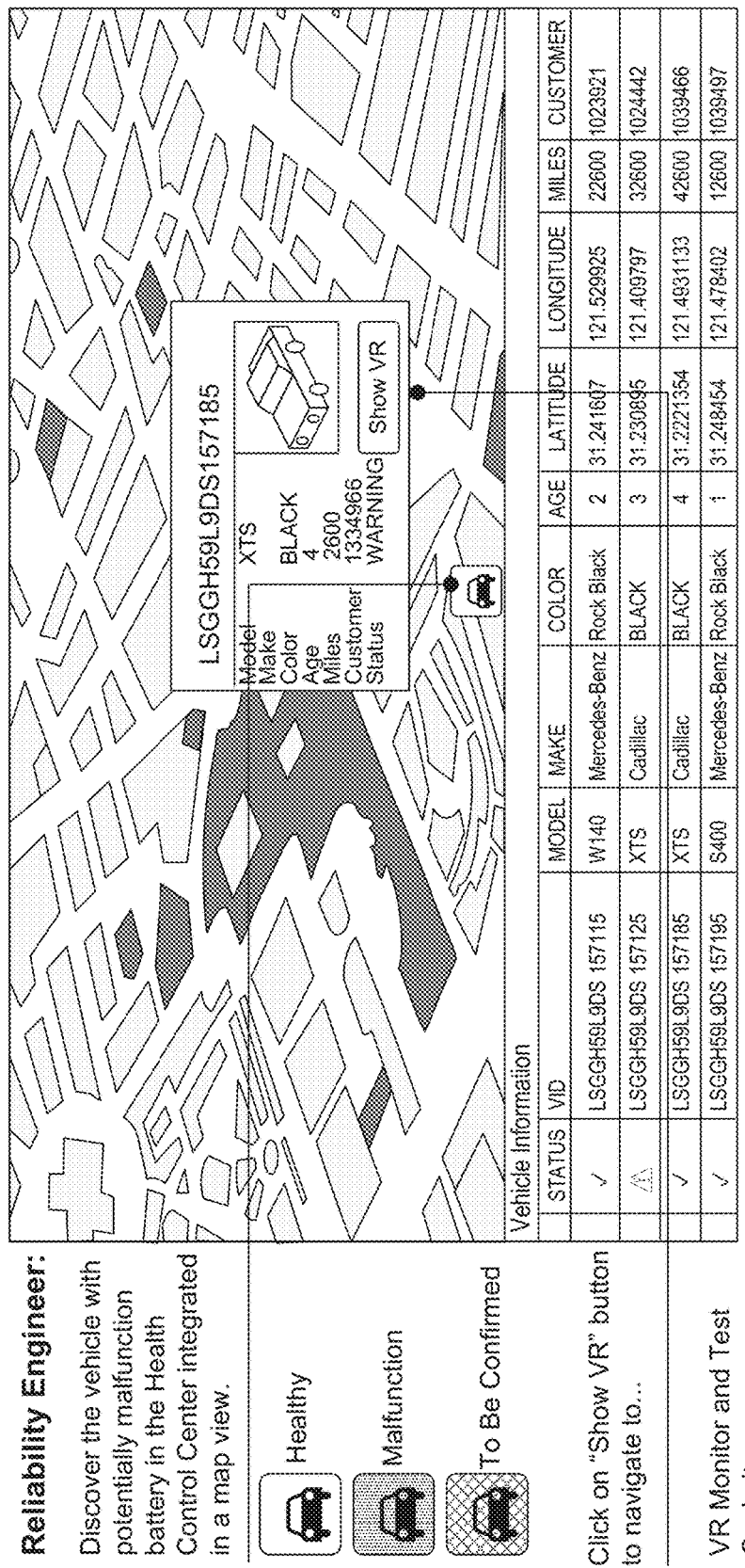
FIG. 10 shows a more detailed informational view of a map similar to that of FIG. 9, according to an example embodiment, in which relevant information may be displayed for a technician, in tabular form with the map and a corresponding legend.

FIG. 10 shows a more detailed informational view of a map similar to that of FIG. 9, according to an example embodiment, in which relevant information may be displayed for a technician, in tabular form with the map and a corresponding legend.

The map of FIG. 10 drills down into information on a specific vehicle, and then shows additional detail broken out for similar vehicles. This curated information relating to similar vehicles may assist a user in the role of a reliability engineer to confirm any predictive health assessments about a particular vehicle or component. To monitoring users, there may be a central overview screen to view all in-monitor scope buses and reflect the buses as green, yellow, or red points in one map, in some embodiments. If any bus is in yellow or red status, user may click the point to pull out a VR model to view detailed information and health status of key components.

Regarding drill-down analysis. Users can drill down to key components, such as electric motors, batteries, controllers, and other components, to view the health status or detailed parameters. It may be necessary to drill down into a battery to evaluate the alert or potential failure impacts, as there may be risks of serious safety hazards, such as batteries exploding or igniting.

In this intuitive way, technicians monitoring vehicle status may observe malfunction scope or components, and may select workable maintenance approach(es), such as entire battery replacement, module replacement, or cell replacement, according to a monitored level of wear or damage, so as to optimize repair costs for particular end users in their own respective locations.

Figure 11:
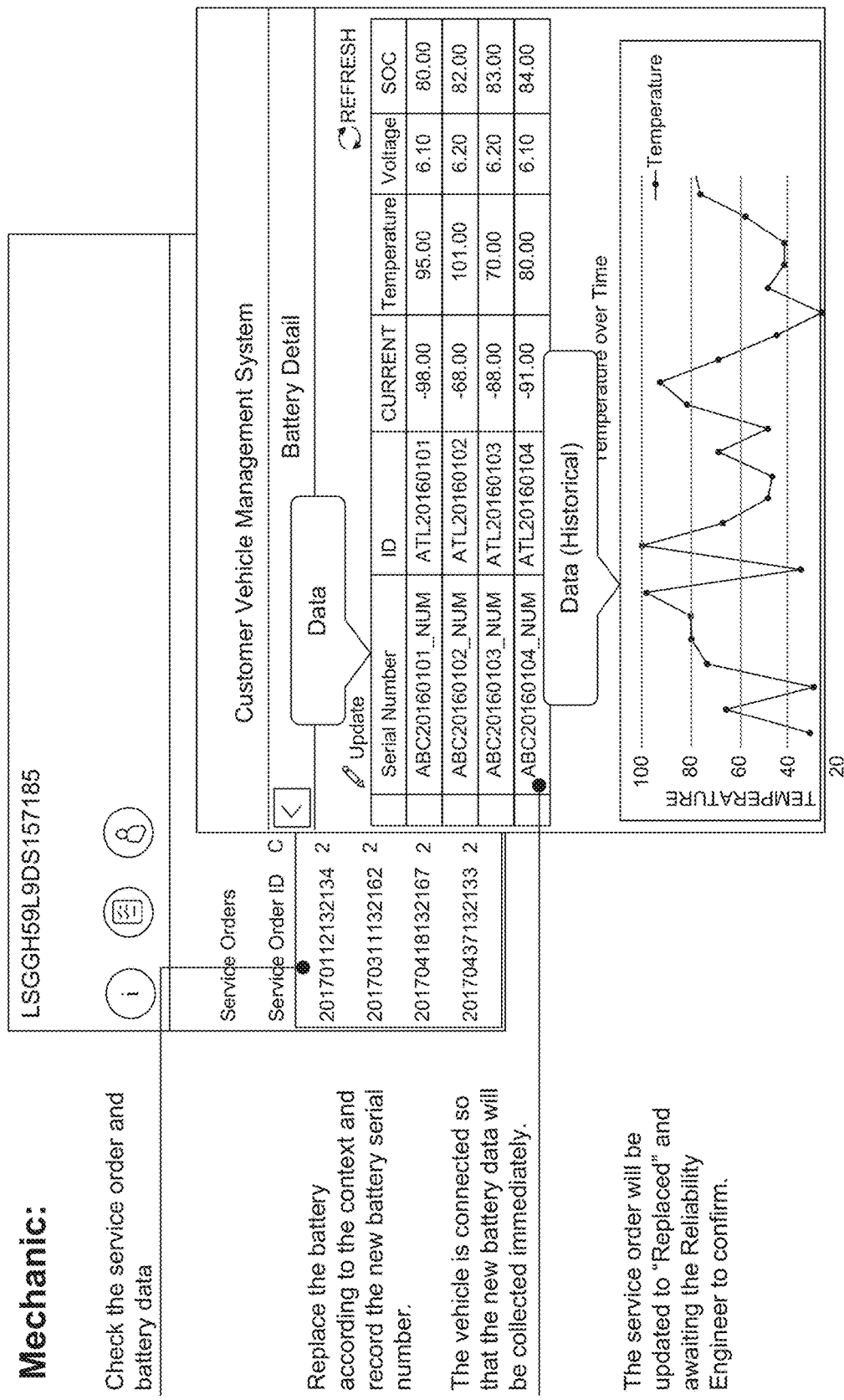
FIG. 11 shows technician-oriented user interfaces for viewing, browsing, sorting, and visualizing select relevant data from certain telematics apparatus, according to an example embodiment, including recommended instructions to the technician.

FIG. 11 shows other technician-oriented user interfaces for viewing, browsing, sorting, and visualizing select relevant data from certain telematics apparatus, according to an example embodiment, including recommended instructions to the technician.

For example, in FIG. 11, detailed data may be shown about component(s), in this case, certain batteries and their status over time, in an exemplary embodiment. Additionally, a detailed view of various components and multiple corresponding parameters may be displayed, in a split view with historical charts) for a given component and parameter. In the example depicted at the lower right-hand side of FIG. 11, a chart of historical data for a given component's temperature over time is displayed, in this non-limiting embodiment. This data represents self-historical status data for the same component(s) or same sensor(s) over time. However, any number of parameters may be charted in any dimensions. Thus, for example, instead of temperature over time, another historical data chart may display temperature over voltage, voltage over temperature, voltage over time, discharge duration over temperature, etc.; multi-dimensional graphs and charts may also be implemented in a similar view.

Stacked behind the front window of the customer vehicle management system with battery detail, in this example embodiment, is another view with a chart of a history of service orders for a given vehicle. In this way, service orders may be tracked and followed up on in such a way as to correlate actual performance of specific components with specific service events. Additionally, it may be possible to start with just a window for service history of a designated vehicle, and upon drilling down into one event or entry, another view or window may expand in front to provide additional detail, data, and/or analytics, for example.

On the left of this display is a text pane, with specific descriptions, notes, and recommendations for a technician to understand the context of the data being displayed. For example, there may be a recommendation to replace a battery, derived from various factors of data analytics performed transparently on a backend server or cluster. Other data fields that may not be self-explanatory may have additional clarifying notes in this margin. While this embodiment shows one configuration of elements as displayed in FIG. 11, an actual implementation may display data and/or text in virtually any order or arrangement.

Figure 12:
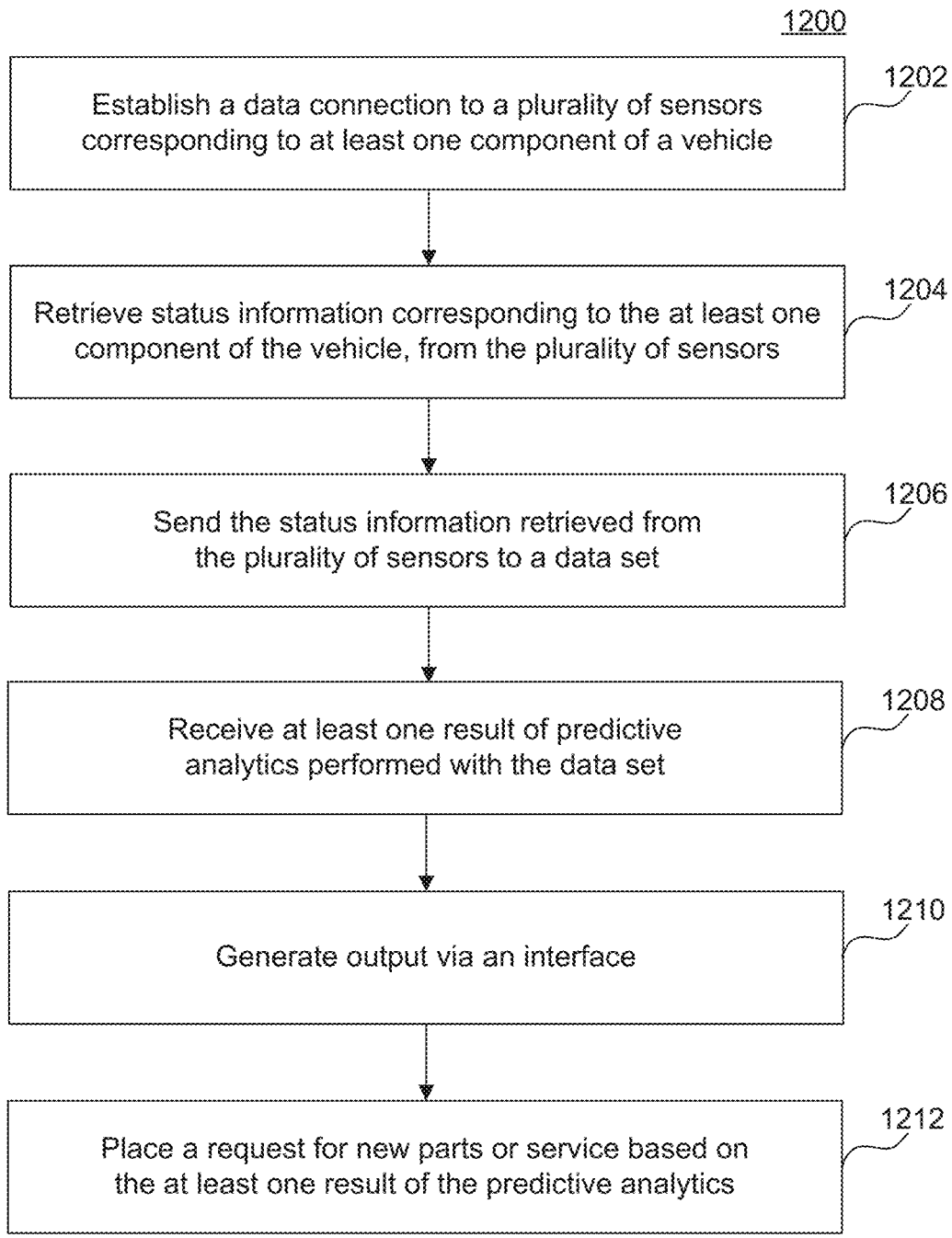
FIG. 12 is a flowchart depicting one execution path, in an example embodiment, among other possible execution paths not explicitly shown.

FIG. 12 is a flowchart depicting one execution path, in an example embodiment, among other possible execution paths not explicitly shown.

FIG. 12 shows process 1200, illustrated by a flowchart illustrating a process for big-data driven telematics operations such as one that may be implemented in or executed on any of the systems shown in FIGS. 2-6C above. This process 1200 may be used by or for any of the embodiments described herein that would have remote (including, but not limited to, cloud-based services) analytics of telemetry or telematics data.

Figure 15:
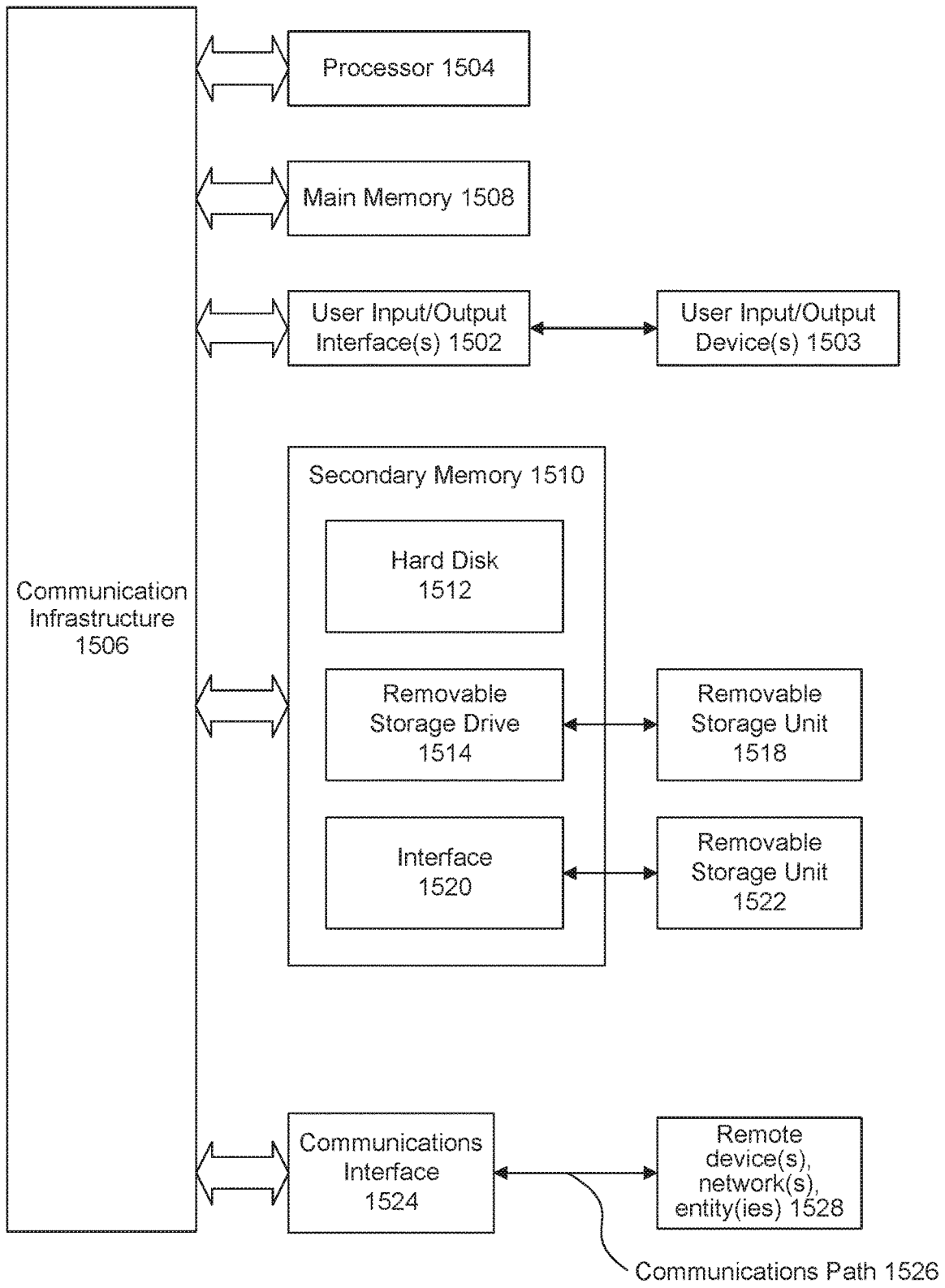
FIG. 15 is an example computer system useful for implementing various embodiments.

In 1202, a processor and memory, such as processor 1504 shown in FIG. 15, may establish a data connection to a plurality of sensors corresponding to at least one component of a vehicle. Such a connection and/or corresponding communication channel may already be open, running, or otherwise initialized; and/or a separate channel or communication session may be newly opened, initialized, and/or established for the purpose of transmitting and/or receiving telematics and/or telemetry data.

in 1204, processor 1504 may retrieve status information corresponding to the at least one component of the vehicle from the plurality of sensors. Status information may be stored in main memory 1508. Status information may include basic physical state such as temperature, pressure, airspeed, angular velocity, G-force acceleration, etc., in some embodiments. Status information may also be life-cycle information, such as an amount of wear, number of times serviced, number of faults, estimated time to failure, amount of time in service, etc., in some other non-limiting embodiments.

In 1206, processor 1504 may send the status information retrieved from the plurality of sensors to a data set. The data set contains at least one of self-historical status information from at least one designated sensor over a designated period of time (such as a log of previous entries from each unique sensor), and past or present status information retrieved from a set of corresponding sensors of at least one other vehicle. In the latter case, it may be helpful to have this information when the at least one other vehicle has at least one type of corresponding component for a given sensor in common, such as in a similar vehicle.

In 1208, processor 1504 and main memory 1508 may receive at least one result of predictive analytics performed with the data set, in some embodiments. As described with respect to 1206 above, the more the same components may be tracked across similar vehicles, the more useful any resulting data analytics would be in generating a prediction. For example, if other vehicles containing the same model of airbag were having trouble with latent defects surfacing at a particular time (contemporaneously or after a certain amount of time in service), the sooner a warning could be relayed to an end user of the same components. For battery wear patterns, such retrieval and tracking may be especially useful, as batteries tend not to wear down all along the same curves over time.

In 1210 processor 1504 may generate output via an interface, in some exemplary embodiments. The output may be a visual or textual pop-up in a graphical environment, in augmented reality, or in virtual reality. The output may also be an API call, such as may be configured to de-activate or disable a dangerous non-essential subsystem of the vehicle, or generate other alerts or alarms, such as audible chimes or voice warnings, in some exemplary embodiments.

In 1212, processor 1504 may place a request for new parts or service based on the at least one result of the predictive analytics, in an embodiment. Following 1210, in cases where replacement parts would be needed, or where a service appointment would be needed at a busy service station or for a busy end user with a known schedule, it may be further desirable to configure automatic remedies to certain situations, especially if the results and turnaround time would not be instant, such as ordering parts by mail or scheduling appointments at service stations that are far away and/or are otherwise busy and difficult to get into.

Process 1200 is disclosed in the order shown above in this exemplary embodiment of FIG. 12. In practice, however, the operations disclosed above, alongside other operations, may be executed sequentially in any order, or they may alternatively be executed concurrently, with more than one operation being performed simultaneously, or any combination of the above.

Figure 13:
FIG. 13 is a rendering of a virtual-reality (VR) service center, with multiple views of components and inventory for ordering, according to an example embodiment.
Figure 13:
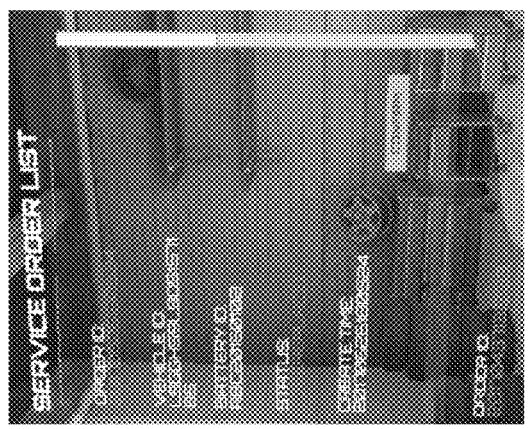

FIG. 13 is a rendering of a VR service center, with multiple views of components and inventory for ordering, according to an example embodiment. For other embodiments, the images of FIG. 13 may similarly represent a real service center with an AR view.

The top view is of a physical arrangement of cells, such as electric battery components in an electric drive vehicle, with enhanced displays of status parameters for each one. Various colors and shading may be used to allow a technician or other user to identify potential problems quickly and intuitively. These parameters may also be displayed near real-world instances of vehicle components, including with AR, such as using heads-up display (HUD) technology.

The bottom view represents a pop-up screen in a VR or AR user interface. Such a pop-up screen is not necessarily related to any specific object in view, but may follow based on the PdMS's response to identifying a need for replacement parts or services. Such a screen allows for easy notice and comprehension of service needs that the PdMS may automatically provide for.

Figure 14:
FIG. 14 is an alternate rendering of a VR service center, resembling an ordinary service center immediately before or after any work would be done by a technician leveraging any additional information provided by a VR user interface. The same benefits of the VR interface may be additionally gained with an augmented-reality (AR) interface, which would overlay VR data atop real-world images before the eyes of a user.

FIG. 14 is an alternate rendering of a VR service center, resembling an ordinary service center immediately before or after any work would be done by a technician leveraging any additional information provided by a VR user interface. The same benefits of the VR interface may be additionally gained with an AR interface, which would overlay the same or similar VR data atop real-world images before the eyes of a user.

In an exemplary embodiment, a VR or AR environment may be manipulated by a gesture, accelerometer input, text command, voice command, infrared port, wireless signal (including Bluetooth, NFC, RFID, Wi-Fi, etc.), API, or other interface, to name a few non-limiting examples.

Additionally, configuration information and changes thereto may be generated by users, machines, or programs, using any number of interfaces such as APIs, protocols, or user tools, including text editors, web-based configuration front-ends, graphical configurators, voice input, environment sensors, etc.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, jQuery, Dojo, Dijit, OpenUI5, AngularJS, Express.js, Backbone.js, Ember.js, DHTMLX, React, Electron, among many other non-limiting examples.

Various embodiments may be implemented, for example, using one or more well-known computer systems, such as computer system 1500 shown in FIG. 15. Computer system 1500 may be used, for example, to implement process 1200 of FIG. 12. For example, computer system 1500 may establish a data connection to a plurality of sensors corresponding to at least one component of a vehicle, retrieve status information corresponding to the at least one component of the vehicle, from the plurality of sensors, send the status information retrieved from the plurality of sensors to a database, receive at least one result of predictive analytics performed with the database, and generate output via an interface, according to an exemplary embodiment.

Computer system 1500 includes one or more processors (also called central processing units, or CPUs), such as a processor 1504. Processor 1504 is connected to a bus or communication infrastructure 1506.

Computer system 1500 also includes user input/output device(s) 1503, such as monitors, keyboards, pointing devices, etc., which communicate with communication infrastructure 1506 through user input/output interface(s) 1502.

One or more processors 1504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes a primary memory or main memory 1508, such as random access memory (RAM). Main memory 1508 may include one or more levels of cache. Main memory 1508 has stored therein control logic (i.e., computer software) and/or data.

Computer system 1500 may also include one or more secondary storage devices or secondary memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to an exemplary embodiment, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a network interface or communication interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communications path 1526.

A computer system may also be any one of a personal digital assistant (PDA), desktop workstation, laptop or notebook computer, netbook, tablet, smart phone, smart watch, or embedded system, to name a few non-limiting examples.

Any such computer system 1500 may run any type of application associated with a layered repository facility, including legacy applications, new applications, etc.

Computer system 1500 may be a client or server, accessing or hosting any applications through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (Paas), desktop as a service (DaaS), framework as a service (FaaS), backend as a service (BaaS), mobile backend as a service (MBaaS), or infrastructure as a service (IaaS); or a hybrid model including any combination of the foregoing examples or other comparable services or delivery paradigms.

In an embodiment, a tangible apparatus or article of manufacture comprising a tangible computer useable or readable medium having control logic (software) stored thereon is also referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use the configuration provider for layered repository using data processing devices, computer systems and/or computer architectures other than that shown in FIG. 15. In particular, embodiments may operate with software, hardware, and/or operating system implementations other than those described herein.

By way of another example, the computer system 1500 may include, but is not limited to, a mobile phone or other mobile device, a personal digital assistant (PDA), a computer, a cluster of computers, a set-top box, a smart watch, a smart phone, a tablet, VR/AR headset or helmet, or other types of device capable of processing instructions and receiving and transmitting data to and from humans and other computing devices. Any VR device may allow additional configurations for improvements in user experience with AR devices accordingly.

In such embodiments, alternative means for moving and manipulating data objects, such as gestures, commands, vocal instructions or voice commands, to name a few non-limiting examples, may be used for VR or AR interfaces as used herein, in some embodiments. Some interfaces may work on the same display or across multiple displays.

In some embodiments, the computer system 1500 may include a user interface controller for processing output provided by applications, such as web browsers, such as may be represented in FIGS. 7-10, for example. These outputs may be a virtual representation of a web browser window, for example. Alternatively, computer system 1500 may be connected to a display such as the output of an interactive terminal screen, which may be viewed on devices such as CRT, plasma, LCD, or OLED monitors or touch screens, in some exemplary embodiments. However, a "display" generally may be any kind of output device, including a printer, speaker, screen reader, signaling device, serial port, or any other output device.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method of monitoring vehicular components, comprising:
   establishing, by at least one processor, a data connection to a plurality of sensors corresponding to at least one component of a first vehicle;
   retrieving, by the at least one processor, status information corresponding to the at least one component of the first vehicle, from the plurality of sensors;
   sending, by the at least one processor, the status information retrieved from the plurality of sensors, to a data set, wherein the data set contains data comprising the status information from at least one designated sensor over a designated period of time, and
   receiving, by the at least one processor, at least one prediction generated as a result of predictive analytics performed using the data set, at least with respect to the status information from the at least one designated sensor over the designated period of time, wherein at least one of the status information or the prediction indicates that the at least one component is or will be worn, damaged, or defective; and
   generating, by the at least one processor, output via an interface, wherein the output comprises a recommendation, based on the prediction, of service for the at least one component of the first vehicle, wherein the service for the at least one component of the first vehicle includes at least one of maintenance, repair, or replacement of the at least one component of the first vehicle.

2. The method of claim 1, wherein the interface is outside of the first vehicle, to interface with a vehicle service-provider, and wherein the interface comprises at least one of a virtual reality (VR) apparatus or an augmented reality (AR) apparatus.

3. The method of claim 1, wherein the data set comprises unstructured data.

4. The method of claim 1, wherein the predictive analytics further comprise at least one of a simulation based on the status information retrieved or a status report of at least one corresponding component of a second vehicle.

5. The method of claim 1, wherein the interface comprises an application programming interface (API), wherein the API is configured to allow the first vehicle to place a request for new parts or service automatically via the API, based at least in part on the prediction or the status information, and wherein the API is further configured to allow the first vehicle to disable or deactivate, automatically via the API, a non-essential system of the first-vehicle that is determined to be in a dangerous state of operation, based at least in part on the prediction or the status information.

6. The method of claim 5, wherein the retrieving further comprises retrieving, via the API, geolocation status information corresponding to the first vehicle as of a time at which the data connection was established; and
   wherein the request is based at least in part on the geolocation status information retrieved.

7. The method of claim 5, wherein the request is placed without direct interaction from any user, wherein a notification is sent to at least one user, and wherein the user comprises a vehicle service-provider, an owner of the first vehicle, a driver of the first vehicle, or a combination thereof.

8. A vehicular telematics system, comprising:
   a memory; and
   at least one processor coupled to the memory and configured to:
      establish a data connection to a plurality of sensors corresponding to at least one component of a first vehicle;
      retrieve status information corresponding to the at least one component of the first vehicle, from the plurality of sensors;
      send the status information retrieved from the plurality of sensors to a data set, wherein the data set contains data comprising the status information from at least one designated sensor over a designated period of time receive at least one result of predictive analytics performed using the data set, at least with respect to the status information from the at least one designated sensor over the designated period of time, wherein at least one of the status information or the prediction indicates that the at least one component is or will be worn, damaged, or defective; and generate output via an interface, wherein the output comprises a recommendation, based on the prediction, of service for the at least one component of the first vehicle, wherein the service for the at least one component of the first vehicle includes at least one of maintenance, repair, or replacement of the at least one component of the first vehicle.

9. The system of claim 8, wherein the interface is outside of the first vehicle, to interface with a vehicle service-provider, and wherein the interface comprises at least one of a virtual reality (VR) apparatus or an augmented reality (AR) apparatus.

10. The method of claim 8, wherein the data set comprises unstructured data.

11. The system of claim 8, wherein the predictive analytics further comprise at least one of a simulation based on the status information retrieved or a status report of at least one corresponding component of a second vehicle.

12. The system of claim 8, wherein the interface comprises an application programming interface (API), wherein the API is configured to allow the first vehicle to place a request for new parts or service automatically via the API, based at least in part on the prediction or the status information, and wherein the API is further configured to allow the first vehicle to disable or deactivate, automatically via the API, a non-essential system of the first-vehicle that is determined to be in a dangerous state of operation, based at least in part on the prediction or the status information.

13. The system of claim 12, wherein the retrieving further comprises retrieving, via the API, geolocation status information corresponding to the first vehicle as of a time at which the data connection was established; and wherein the request is based at least in part on the geolocation status information retrieved.

14. The system of claim 12, wherein the request is placed without direct interaction from any user, wherein a notification is sent to at least one user, and wherein the user comprises a vehicle service-provider, an owner of the first vehicle, a driver of the first vehicle, or a combination thereof.

15. A non-transitory computer-readable storage device having instructions stored thereon that, when executed by at least one computing device, causes the at least one computing device to perform operations comprising:

establishing a data connection to a plurality of sensors corresponding to at least one component of a first vehicle;

retrieving status information corresponding to the at least one component of the first vehicle, from the plurality of sensors;

sending the status information retrieved from the plurality of sensors to a data set, wherein the data set contains data comprising the status information from at least one designated sensor over a designated period of time receiving at least one result of predictive analytics performed using the data set, at least with respect to the status information from the at least one designated sensor over the designated period of time, wherein at least one of the status information or the prediction indicates that the at least one component is or will be worn, damaged, or defective; and generating output via an interface, wherein the output comprises a recommendation, based on the prediction, of service for the at least one component of the first vehicle, wherein the service for the at least one component of the first vehicle includes at least one of maintenance, repair, or replacement of the at least one component of the first vehicle.

16. The non-transitory computer-readable storage device of claim 15, wherein the interface is outside of the first vehicle, to interface with a vehicle service-provider, and wherein the interface comprises at least one of a virtual reality (VR) apparatus or an augmented reality (AR) apparatus.

17. The non-transitory computer-readable storage device of claim 15, wherein the predictive analytics further comprise at least one of a simulation based on the status information retrieved or a status report of at least one corresponding component of a second vehicle.

18. The non-transitory computer-readable storage device of claim 15, wherein the interface comprises an application programming interface (API), wherein the API is configured to allow the first vehicle to place a request for new parts or service automatically via the API, based at least in part on the prediction or the status information, and wherein the API is further configured to allow the first vehicle to disable or deactivate, automatically via the API, a non-essential system of the first-vehicle that is determined to be in a dangerous state of operation, based at least in part on the prediction or the status information.

19. The non-transitory computer-readable storage device of claim 18, wherein the retrieving further comprises retrieving, via the API, geolocation status information corresponding to the first vehicle as of a time at which the data connection was established; and wherein the request is based at least in part on the geolocation status information retrieved.

20. The non-transitory computer-readable storage device of claim 18, wherein the request is placed without direct interaction from any user, wherein a notification is sent to at least one user, and wherein the user comprises a vehicle service-provider, an owner of the first vehicle, a driver of the first vehicle, or a combination thereof.

* * * * *